United States Patent [19]

Nakamura et al.

[11] 4,127,799
[45] Nov. 28, 1978

[54] APPARATUS FOR DAMPING ROTATION OF TURNTABLE

[75] Inventors: Tsutomu Nakamura; Ryuichi Koike, both of Toyokawa, Japan

[73] Assignee: Hitachi, Ltd., Japan

[21] Appl. No.: 823,654

[22] Filed: Aug. 11, 1977

[30] Foreign Application Priority Data

Aug. 16, 1976 [JP] Japan .................. 51-97070

[51] Int. Cl.² .................. H02P 3/10
[52] U.S. Cl. .................. 318/373; 318/138; 318/254
[58] Field of Search .............. 318/138, 254, 439, 371, 318/373

[56] References Cited

U.S. PATENT DOCUMENTS

| 3,466,520 | 9/1969 | Aylicki et al. | 318/254 |
| 3,706,021 | 12/1972 | Yawagida | 318/373 |
| 3,792,329 | 2/1974 | Kuhnlein | 318/373 |

Primary Examiner—Robert K. Schaefer
Assistant Examiner—M. K. Mutter
Attorney, Agent, or Firm—Craig & Antonelli

[57] ABSTRACT

A disc record player in which a turntable is driven by a motor comprising a rotor magnet having plural magnetic poles arranged separately along the periphery of the turntable, stator coils disposed in the magnetic field of the rotor magnet and Hall-effect elements sequentially coupled magnetically to the poles of the rotor magnet for generating output signals having polarities corresponding to the polarities of the poles of the rotor magnet, and causing the rotor magnet to rotate by supplying the output signals of the Hall-effect elements to the stator coils, wherein a first and a second speed detecting coils for generating signals having phases different from each other are disposed in the magnetic field of the rotor magnet, wherein the output signals of the first and second speed detecting coils respectively turn the gate circuit off and on and when the turntable is to be stopped, the gate circuit is turned on by the output signal of the second speed detecting coil, and wherein the rotation of the turntable is damped by controlling the polarities of the output signals of the Hall-effect elements with the output signal of the gate circuit and thereby causing the stator coils to generate the magnetic flux to rotate the rotor magnet in the reverse direction.

4 Claims, 3 Drawing Figures

APPARATUS FOR DAMPING ROTATION OF TURNTABLE

LIST OF PRIOR ART REFERENCES (37CFR 1.56 (a))

The following references are cited to show the state of the art:

Japanese Laid-open Patent Applications

No. 50-18004 "Turntable Device of Record Player"
No. 50-71301 "Device for Braking Rotation of Turntable"
No. 51-21122 "Braking Device for A.C. Motor"
No. 51-22020 "Deceleration Device for Commutatorless D.C. Motor"
No. 51-41813 "Speed Control Device for Commutatorless Motor"

This invention relates to a damping apparatus for damping the rotation of the turntable of a disc record player, a magnetic tape recorder and player.

A disc record player for play back, i.e. reproduce, a disc record has a turntable on which the disc record is put to rotate. It is necessary for such a turntable to rotate at a constant speed, independent of the change in the load on it. For this reason the turntable usually has a large mass and therefore a large moment of inertia to avoid an influence by the load fluctuation.

The disc record player is apt to be vibrated by sound waves generated by speakers and the vibration is caught by the cartridge of the pickup arm to cause howling as a result of feedback effect. A turntable having a large mass is hard to vibrate and therefore can prevent howling so that it is preferable to increase the mass of the turntable so long as too large a load is not imposed on the bearing of the rotary shaft of the turntable.

In a disc record player of direct drive type in which the r.p.m. of the motor for driving the turntable is made equal to the r.p.m. of the turntable for reproducing the disc record and in which the turntable is driven directly by the motor without using any idler or belt by directly coupling the drive shaft of the motor to the rotary shaft of the turntable (this type of disc record player is hereafter referred to also as a direct drive player), a servo-circuit is provided which detects the rotational speed of the turntable and accordingly controls the rotational speed of the motor so as to cause the turntable to rotate at a desired, exactly constant speed. With such a direct drive player, the greater is the mass of the turntable, the more stable is the servoloop. Therefore, it is preferable to make the mass of the turntable as large as possible within an allowable limit.

However, as the mass of the turntable is increased, it becomes more difficult to stop the rotating turntable instantly since the increase in the mass is necessarily accompanied by the increase in inertia.

Disc records are usually grouped into EP records which are reproduced at 45 r.p.m. and LP records which are played back at 33⅓ r.p.m. Accordingly, when it is desired to reproduce an LP record after an EP record has been finished or while the EP record is being player back, the rotational speed of the turntable must be switched over from 45 r.p.m. to 33⅓ r.p.m. When the turntable has a large mass, it takes rather a long time for the rotational speed of the turntable to reach 33⅓ r.p.m. Even if two records of a group are successively played back, the rotation of the turntable after the end of the reproduction of the first record cannot be stopped immediately due to the large inertia so that it also takes a long time for the second record to be set on the still turntable for the next reproduction.

In a direct drive player in which the drive motor is rotated at 45 and 33⅓ r.p.m., no load is imposed on the turntable while it is rotating under inertial force since the direct drive player uses no idler and belt. Consequently, even if the power supplied to the drive motor is cut off, the turntable adversely continues to rotate for a long time.

Therefore, in a direct drive player using a turntable having a large mass, it is preferable to forcibly damp the rotation of the turntable when it is desired to stop the rotation or to lower the rotational speed. To damp the rotation of the turntable a mechanical damping apparatus may be used which damps the rotation by pressing a brake shoe against the periphery or the rotary shaft of the turntable. However, such a mechanical damping apparatus is apt to generate the vibration of the turntable or frictional noise by the brake shoe. It is also difficult to precisely define the damping time to reduce the rotational speed, and the apparatus needs too complicated a constitution to exactly determine the damping time. In the case where it is desired to stop the rotation of the turntable of a direct drive player or to decrease the rotational speed of the turntable, it is preferable to damp the rotation of the turntable by generating a counter-rotational torque in the drive motor. It is, however, necessary also to prevent the turntable from rotating in the opposite direction due to the counter torque, that is, it is necessary to reduce the counter torque of the drive motor to zero just when the turntable comes to a halt.

The Japanese Patent Publication No. 18004/75 discloses a damping apparatus for a turntable, which damps the rotation of the turntable by generating a counter torque in the motor for driving the turntable when it is desired to bring the turntable to a halt. The structure of the damping apparatus is as follows. The apparatus comprises a stator coil and a rotor magnet having plural magnetic poles arranged along the periphery of the turntable. A disc having plural slits is rotated together with the rotor magnet. A light source is disposed on one side of the disc and a first light receiving element on the other side. The angular distance of any two adjacent slits is 22.5°. The light from the source is passed through the slits and received by the light receiving element so that the element generates a pulse signal having a frequency proportional to the rotational speed of the disc. The drive motor is rotated without brush by controlling the polarity of the current supplied to the stator coil in accordance with the pulse signal. A second light receiving element is provided on the same side of the disc as the first light receiving element, the second element being separated from the first one by an angular distance of 45°. The output signal of the second element is 180° out of phase from the output signal of the first element. When it is desired to stop the rotation of the turntable, the polarity of the drive current through the stator coil is so controlled by the output signal of the second element that the stator coil may generate magnetic flux to rotate the rotor magnet in the reverse direction.

It is therefore one object of this invention to provide an apparatus for damping the rotation of the turntable of a direct drive disc record player.

Another object of this invention is to provide an apparatus for damping the rotation of the turntable of a direct drive disc record player, in which when it is desired to stop the rotation of the turntable or to decrease the rotational speed of the turntable, a counter torque is generated in the drive motor while when the rotation of the turntable ceases, the counter torque is reduced to zero.

In the damping apparatus for damping the rotation of the turntable, the rotary shaft of the turntable is directly coupled to the drive shaft of the motor and the motor comprises a rotor magnet having plural magnetic poles arranged separately along the periphery of the turntable; stator coils disposed in the magnetic field of the rotor magnet; Hall-effect elements sequentially coupled magnetically to the poles of the rotor magnet, for generating output signals having polarities corresponding to the polarities of the poles of the rotor magnet; and speed detectors disposed in the magnetic field of the rotor magnet, for generating speed signals having a frequency corresponding to the rotational speed of the rotor magnet. The rotor magnet is therefore rotated by the drive magnetic flux generated by the stator coils through the supply of the output signals of the Hall-effect elements to the stator coils.

The motor also has a speed control circuit, to which the speed signal from the speed detector is supplied. The speed signal is converted there into D.C. voltage having a value corresponding to the frequency thereof. This D.C. voltage is compared with the voltage of a reference voltage source. The difference between the two compared voltages is applied to the Hall-effect elements so that the output currents from the Hall-effect elements are controlled to control the rotational speed of the rotor magnet.

The speed signal from the speed detector is supplied to a first signal converter, which converts the speed signal to a first pulse signal having a repetition frequency corresponding to the frequency of the speed signal. In the magnetic field of the rotor magnet of the motor is also provided a second speed detector which generate a second speed signal slightly out of phase from the first speed signal delivered from the first speed detector, the first speed signal having a frequency corresponding to the rotational speed of the rotor magnet and controlling the rotational speed of the rotor magnet. The second speed signal is supplied to a second signal converter, which converts the second speed signal to a second pulse signal having a repetition frequency corresponding to the frequency of the second speed signal. The first and second pulse signals are both supplied to a first switching circuit, which is alternately turned on and off under the control of the first and second pulse signals to intermittently deliver a control signal. The control signal controls a second switching circuit, supplies a negative voltage to the Hall-effect elements through the second switching circuit when the turntable is to be stopped, and causes the stator coils to generate magnetic flux to drive the rotor magnet in the reverse direction so as to damp the rotation of the turntable.

According to the damping apparatus embodying this invertion, the rotation of the turntable can be electrically damped so that the generation of vibration can be prevented and that the rotational speed of the turntable can be changed from 45 r.p.m. to 33⅓ r.p.m. in a short time.

Other objects, features and advantages of this invention will be apparent when one reads the following description of this specification in conjunction with the attached drawings, in which.

Figure 1:
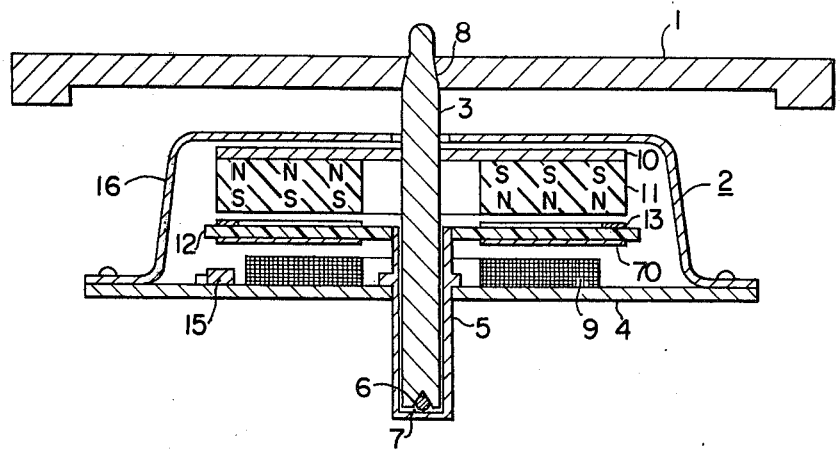
FIG. 1 shows in cross section a motor used in a damping apparatus for damping the rotation of turntable, embodying this invention.

FIG. 1 shows in cross section a turntable and a motor of a disk record player using an apparatus for damping the rotation of the turntable. A turntable 1 is fixed to the drive shaft 3 of a motor 2 and directly driven by the motor 2. The motor 2 has a flat yoke plate 4 of magnetic substance in the center of which a bearing 5 is attached extending perpendicular to the yoke plate 4. The bearing 5 receives the drive shaft 3 of the motor 2 and the shaft 3 is rotatably supported by the bearing 5. A tapering bore 6 is cut in the bottom end of the shaft 3 and a ball bearing 7 is fitted in the tapering bore 6. The top end of the drive shaft 3 has a tapering portion 8 to which the turntable is fixedly mounted. The upper end of the tapering portion 8 protrudes from the upper surface of the turntable 1 to serve as a record guide to be inserted for positioning into the center hole of a disc record. On the upper surface of the yoke plate 4 is attached a stator coil 9, which is insulated from the yoke plate 4 and arranged about the drive shaft 3. An upper yoke 10 is fixedly attached in the middle portion of the shaft 3 and a disc-shaped rotor magnet 11 is fastened by adhesive agent to the lower surface of the upper yoke 10. The rotor magnet 11 is a ferrite magnet magnetized in the direction of thickness and split into plural pole pieces arranged symmetrically about the shaft 3. The plural pole pieces are so magnetized that the faces of any two adjacent pole pieces may have opposite polarity. An insulating plate 12 is disposed between the stator coil 9 and the rotor magnet 11 and the insulating plate 12 is fixed to the top end of the drive shaft bearing 5. On the upper surface of the insulating plate 12 is provided a first speed detecting coil 13 which is formed by a print-circuit technique and consists of plural component conductors extending radially about the drive shaft 3. Also, on the lower surface of the insulating plate 12 is provided a second speed detecting coil 70 which is formed by the print-circuit technique, too, and consists of plural component conductors extending radially from the drive shaft 3. The component conductors of the first and second speed detecting coils 13 and 70 are respectively connected in series with one another and both the coils 13 and 70 are magnetically coupled to the rotor magnet 11. The component conductors of the first speed detecting coil 13 are slightly staggered from the component conductors of the second speed detecting coil 70 in the circular direction so as not to overlap with one another. A Hall-effect element 15 is fastened by adhesive agent to the upper surface of the yoke plate 4. The Hall-effect element 15 senses sequentially the magnetic fluxes from the pole pieces of the rotor magnet 11 and delivers a positive or a negative signal depending on the polarities of the pole pieces. A cup-shaped cover 16 is attached to the yoke plate 4 and the cover 16 together with the yoke plate 4 houses the rotor magnet 11, the stator coil 9, the first and second speed detecting coils 13 and 14, and the Hall-effect element 15.

Figure 2:
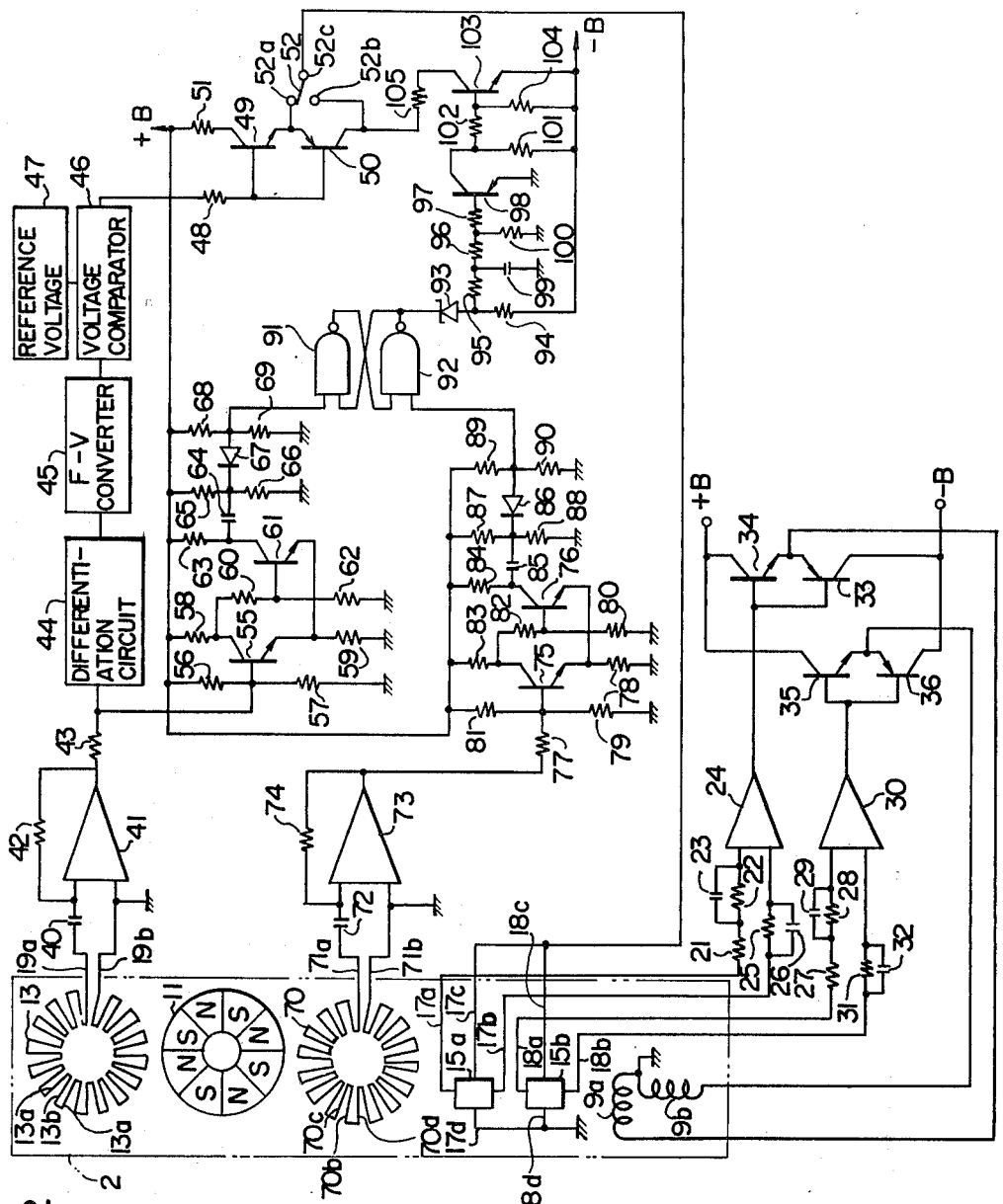
FIG. 2 shows the circuit of an apparatus for damping the rotation of turntable as an embodiment of this invention.

FIG. 2 shows the circuit of an apparatus for damping the rotation of turntable, as an embodiment of the present invention, in which the motor 2 shown in FIG. 1 is shown enclosed in a box of dashed line 2. The rotor magnet 11 has eight separate pole pieces arranged symmetrically in the peripheral direction. The pole pieces are so magnetized that any two adjacent pole pieces may have opposite polarities. Two Hall-effect elements 15a and 15b are disposed in the magnetic field of the rotor magnet 11. These elements 15a and 15b correspond to the Hall-effect element 15 shown in FIG. 1 and subtend an angle of 22.5° with respect to the center axis of the drive shaft 3. The first speed detecting coil 13 disposed in the field of the rotor magnet 11 has plural component conductors 13a, 13b, 13c, . . . etc. radially extending and equally spaced from one another. The component conductors are connected in series by alternately connecting the outer and inner ends of the conductors. The speed detecting coil 13 delivers a speed signal. The two Hall-effect elements 15a and 15b sense the magnetic fluxes from the respective pole pieces and deliver positive or negative signals depending on the polarities of the pole pieces magnetically affecting them. One 17a of the two output terminals 17a and 17b of the Hall-effect element 15a is connected with the first input terminal of a first drive amplifier 24 through a resistor 21 and a series circuit of a resistor 22 and a capacitor 23 and the other output terminal 17b of the element 15a is connected with the second input terminal of the drive amplifier 24 through a parallel circuit of a resistor 25 and capacitor 26. Thus, the outputs of the Hall-effect element 15a are amplified by the amplifier 24. One 18a of the two output terminals 18a and 18b is connected with the first input terminal of a second drive amplifier 30 through a resistor 27 and a series circuit of a resistor 28 and a capacitor 29 and the other output terminal 18b is connected with the second input terminal of the second drive amplifier 30 through a parallel circuit of a resistor 31 and a capacitor 32. Thus, the outputs of the Hall-effect element 15b are amplified by the amplifier 30. The output terminal of the first drive amplifier 24 is connected with the junction point of the bases of a PNP transistor 33 and an NPN transistor 34 connected in a complementary push-pull configuration. The transistors 33 and 34 constitute a first output amplifier. The collector of the transistor 33 is connected with a negative power source and the collector of the transistor 34 with a positive power source. The emitters of the transistors 33 and 34 are connected in common with a first stator coil 9a. The output terminal of the second drive amplifier 30 is connected with the junction point of the bases of an NPN transistor 35 and a PNP transistor 36 connected in a complementary push-pull configuration. The transistors 35 and 36 constitute a second output amplifier whose output is derived from the junction point of the emitters of the transistors 35 and 36 and the junction point is connected with a second stator coil 9b. The stator coils 9a and 9b are angularly spaced from each other by 22.5°. The first and second stator coils 9a and 9b respectively receive the outputs of the first and second output drive amplifiers to generate drive flux. The rotor magnet 11 is rotated by the magnetic flux generated by the first and second stator coils 9a and 9b.

As the rotor magnet 11 starts rotating, the component conductors 13a, 13b, 13c, . . . of the first speed detecting coil 13 move across the flux from the pole pieces of the rotor magnet 11 so that coil 13 delivers a speed signal having a frequency corresponding to the rotational speed of the rotor magnet 11. One 19a of the two output terminals 19a and 19b of the speed detecting coil 13 is connected with the first input terminal of an amplifier 41 through a capacitor 40 and the other output terminal 19b is connected with the second input terminal of the amplifier 41. The amplifier 41 along with a negative feedback resistor connected between the output terminal and the first input terminal constitutes a low-frequency amplifier and serves to amplify the output of the speed detecting coil 13. The output signal of the amplifier 41 is supplied to the input terminal of a differentiating circuit 44 through a resistor 43. The differentiating circuit 44 converts the analog speed signal amplified by the amplifier 41 into a pulse signal having a repetition frequency equal to the frequency of the analog speed signal. The output signal of the differentiating circuit 44 is supplied to the input terminal of a frequency-voltage converter 45 and converted to a D.C. voltage corresponding to the repetition frequency of the pulse signal. The frequency-voltage converter 45 is constituted of, for example, a monostable multivibrator and an integrating circuit. The monostable multivibrator is controlled by the output pulse signal of the differentiating circuit 44; each time the pulse signal is supplied to the multivibrator, it is inverted from stable to non-stable state and after a predetermined period of time has lapsed, it restores the stable state to deliver a pulse having a constant duration. The repetition period of this pulse signal is proportional to the frequency of the output pulse signal of the differentiating circuit 44. The output pulse signal of the monostable multivibrator is integrated by the integrating circuit and converted to a constant positive D.C. voltage. The frequency-voltage converter 45 delivers its output to a voltage comparator 46 having a reference voltage source 47. The voltage comparator 46 compares the output D.C. voltage of the frequency-voltage converter 45 with the positive D.C. voltage of the reference voltage source 47 so as to obtain the difference equal to the reference voltage minus the output D.C. voltage of the F-V converter 45. When the rotor magnet 11 is rotating at a high speed, the frequency of the output signal of the speed detecting coil 13 is high. Accordingly, the output voltage of the F-V converter 45 is high so that the output voltage of the voltage comparator 46. As the rotational speed of the rotor magnet 11 increases, the output voltage of the voltage comparator 46 decreases until it becomes negative. The output signal of the voltage comparator 46 is supplied through a resistor 48 to the junction point of the bases of an NPN transistor 49 and a PNP transistor 50 connected in a complementary push-pull configuration. The transistor 49 has its collector connected through a resistor 51 with a positive power source and its emitter connected with the emitter of the transistor 50. The emitters of the transistors 49 and 50 are connected in common with the stationary contact 52a of a start and stop switch 52 and the movable contact 52c of the switch 52 is connected with the input terminals 17c and 18c of the Hall-effect elements 15a and 15b. The input terminals 17d and 18d of the Hall-effect elements 15a and 15b are grounded. When the voltage comparator 46 delivers a signal having positive voltage, the signal is amplified by the transistor 49 and supplied through the contacts 52a and 52c of the switch 52 to the Hall-effect elements 15a and 15b so that the outputs of the Hall-effect elements 15a and 15b are controlled to control the rotational speed of the rotor magnet 11.

The output signal of the amplifier 41 is supplied also to the base of a first switching transistor 55. The base of the transistor 55 is connected through a resistor 56 with the positive power source and also grounded through a resistor 57. The collector of the transistor 55 is connected to the positve power source through a resistor 58 and also to the base of a second switching transistor 61 through a resistor 60. The emitter of the transistor 55 is connected with the emitter of the transistor 61 and also grounded through a resistor 59. The transistor 61 has its base grounded through a resistor 62 and its collector connected with the positive power source through a resistor 63 and also to the cathode of a diode 67 through a capacitor 64. The cathode of the diode 67 is connected with the positive power source through a resistor 65 and also grounded through a resistor 66 while the anode of the diode 67 is connected with the positive power source through a resistor 68 and also grounded through a resistor 69. The first and second switching transistors 55 and 61 constitute a Schmitt trigger which converts the sinusoidal output signal of the speed detecting coil 13 to a pulse signal. Accordingly, the transistors 55 and 61 serve as a signal converter whose pulse output is differentiated by the capacitor 64, the resistors 65, 66, 68 and 69, and the diode 67 to produce trigger pulses.

A second speed detecting coil 70 is also disposed in the magnetic field of the rotor magnet 11. The second speed detecting coil 70 has the same constitution as the first speed detecting coil 13, consisting of plural component conductors 70a, 70b, 70c, ... arranged in the same pitch as the conductors 13a, 13b, 13c, ..., and the conductors move across the flux of the rotor magnet 11 so that the coil 70 delivers a sinusoidal output signal. The component conductors 13a, 13b, 13c, ... of the first speed detecting coil 13 are slightly staggered in arrangement from the component conductor 70a, 70b, 70c, ... of the second speed detecting coil 70. Namely, the coils 13 and 70 so arranged that the output signal of the first speed detecting coil may be electrically 60° out of phase from the output signal of the second speed detecting coil 70. One 71a of the two output terminals 71a and 71b of the second speed detecting coil 70 is connected through a capacitor 72 with one of the two input terminals of a negative feedback amplifier 73 and the other output terminal 71b of the coil 70 is connected with the other input terminal of the amplifier 73. The negative feedback amplifier 73 with a resistor 74 is a low-frequency amplifier having the same constitution as the amplifier 41 and the output signal of the amplifier 73 is supplied through a resistor 77 to the base of a third switching transistor 75. The emitter of the transistor 75 is connected with the emitter of a fourth switching transistor 76 and also grounded through a resistor 78. The third and fourth transistors 75 and 76 constitute a Schmitt trigger along with resistors 79 and 80 connecting the bases of the transistors 75 and 76 with the ground potential, resistors 81 and 82 connecting the bases with the positive power source and resistors 83 and 84 connecting the collectors of the transistors 75 and 76 with the positive power source. The collector of the transistor 76 is connected through a capacitor with the cathode of a diode 86. The cathode of the diode 86 is connected through a resistor 87 with the positive power source and also grounded through a resistor 88. The anode of the diode 86 is connected through a resistor 89 with the positive power source and also grounded through a resistor 90. The capacitor 85, the resistors 87, 88, 89 and 90, and the diode 86 constitute a differentiating circuit. The output signal of the second speed detecting coil 70 is also converted to a pulse signal by the transistors 75 and 76 and the pulse signal is converted to trigger pulses by the differentiating circuit.

One of the two input terminals of a NAND gate 91 is connected with the anode of the diode 67 and one of the two input terminals of a NAND gate 92 is connected with the anode of the diode 86. The other input terminal of the NAND gate 91 is connected with the output terminal of the NAND gate 92 and the other input terminal of the NAND gate 92 is connected with the output of the NAND gate 91. The NAND gates 91 and 92 constitute a reset-set flip-flop circuit whose reset terminal is connected with the anode of the diode 67 and whose set terminal is connected with the anode of the diode 86. When a trigger pulse is delivered from the anode of the diode 67, the voltage at the output terminal of the gate 92 becomes zero while when a trigger pulse is delivered from the anode of the diode 86, the voltage at the output terminal of the gate 92 becomes positive. The gates 91 and 92 serve as a switching circuit controlled by two trigger pulses. The output terminal of the gate 92 is connected with the cathode of a zener diode 93. The anode of the zener diode 93 is connected with a negative power source through a resistor 94 and also with the base of a fifth switching transistor 98 through a series of resistors 95, 96 and 97. The junction point of the resistors 95 and 96 is grounded through a capacitor 99 and the junction point of the resistors 96 and 97 is grounded through a resistor 100. The fifth switching transistor 98 has its emitter grounded and its collector connected with the negative power source through a resistor 101 and also with the base of a sixth switching transistor 103 through a resistor 102. The sixth switching transistor 103 has its base connected with the negative power source through a resistor 104, its emitter connected directly with the negative power source, and its collector connected with the collector of the PNP transistor 50 through a resistor 105. The collector of the PNP transistor 50 is also connected with the stationary contact 52b of the start and stop switch 52.

With the apparatus described above, when the rotor magnet 11 is started or is rotating at a steady speed, the movable contact 52c of the switch 52 rests on the stationary contact 52a so that the output voltage of the voltage comparator 46 is supplied through the transistor 49 to the Hall-effect elements 15a and 15b. Therefore, at the start of the rotor magnet 11, the positive voltage of the reference voltage source 47 is applied to the Hall-effect elements 15a and 15b while at the steady rotation the difference voltage between the output voltage of the F-V converter 45 and the voltage of the reference voltage source 47 is applied to the elements 15a and 15b.

Figure 3:
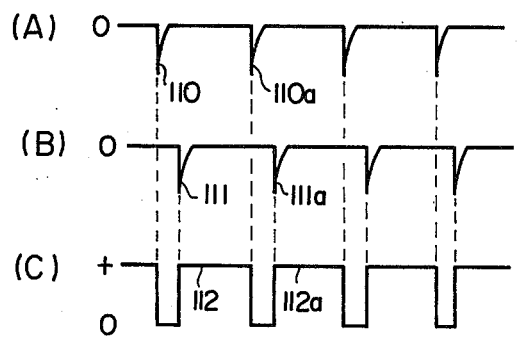
FIG. 3 shows the waveforms of trigger pulses from differentiating circuits and the waveform of the output signal from a gate circuit, the differentiating circuits and the gate circuit being used to embody this invention.

When it is desired to stop the rotation of the rotor magnet 11, the movable contact 52c of the switch 52 is brought into contact with the stationary contact 52b. Since the first and second speed detecting coils 13 and 70 are so disposed in the magnetic field of the rotor magnet 11 that the output signals of the coils 13 and 70 are electrically 60° out of phase from each other, the trigger pulses at the anode of the diode 67 are electrically 60° out of phase from the trigger pulses at the anode of the diode 86. In FIG. 3, the waveform (A) corresponds to the trigger pulses appearing at the anode of the diode 67 and the waveform (B) to the trigger pulses appearing at the anode of the diode 86. The trigger pulses 110 and 111 having the waveforms (A) and (B) are supplied respectively to the input terminals of the NAND gates 91 and 92. Since the trigger pulses 110 and 111 are electrically 60° out of phase from each other, there is an interval of electrical 300° from the trigger pulse 111 to the next trigger pulse 110 and the gates 91 and 92 are in the reset state during the interval. The trigger pulses 110 and 111 are supplied respectively to the input terminals of the gates 91 and 92 and the gates 91 and 92 are in the set state during the interval from the trigger pulse 111 to the next triger pulse 110a so that a positive D.C. voltage 112 having a waveform (C) in FIG. 3 appears at the output terminal of the gate 92. The voltage 112 is higher than the zener voltage of the zener diode 93 and applied through the zener diode 93 to the base of the transistor 98. The transistor 98 is turned on by this voltage 112 so that the voltage at the collector thereof approaches the reference voltage to turn the transistor 103 on. Upon the conduction of the transistor 103, the voltage at the collector thereof becomes negative and is applied to the Hall-effect elements 15a and 15b so that the phases of the output of the elements 15a and 15b are inverted. Consequently, the stator coils 9a and 9b generate the fluxes to rotate the rotor magnet 11 in the reverse direction so that the rotation of the rotor magnet 11 and therefore the turntable 1 is damped. When the rotation of the rotor magnet 11 slows down, the output signal voltages of the first and second speed detecting coils 13 and 70 fall so that the operations of the switching transistors 55, 61, 75 and 76 cease to stop the generation of the trigger pulses 110 and 111. As a result, the outputs of the gates 91 and 92 vanish so that the transistors 97 and 103 are cut off to prevent the reverse rotation of the rotor magnet 11.

When the rotational speed of the turntable is changed from 45 r.p.m. to 33s⅓ r.p.m., the voltage of the reference voltage source 47 has only to be lower than the value corresponding to 45 r.p.m. In that case, the movable contact of the switch 52 is connected with the stationary contact 52a. When the voltage of the reference voltage source 47 is shifted to the lower value, the voltage becomes lower than the output voltage of the F-V converter 45 for 45 r.p.m. so that the output voltage of the voltage comparator 46 becomes negative to turn the transistor 49 cut off and the transistor 50 on. Then, the transistor 103 is turned on by the output signal of the gates 91 and 92 and the negative voltage is applied to the Hall-effect elements 15a and 15b through the transistor 103 and the transistor 50 to damp the rotation of the rotor magnet 11 and therefore the turntable 1. When the rotational speed of the turntable 1 is settled to 33⅓ r.p.m., the output voltage of the voltage comparator 46 becomes positive so that the transistor 50 is cut off and the transistor 49 is turned on. Accordingly, the turntable 1 enters into the steady rotation.

In the case where the turntable 1 is manually rotated in the reverse direction, there is only an interval of electrical 60° between the trigger pulses 110 and 111 so that the gates 91 and 92 triggered into the set state by the trigger pulse 111 are soon reset by the trigger pulse 110 to prevent the turntable 1 from rotating in the reverse direction.

The switch 52 may be omitted if the Hall-effect elements 15a and 15b are connected directly to the emitters of the transistors 49 and 50. In such a case, only when it is desired to stop the turntable 1, the output voltage of the voltage comparator 46 is turned negative to render the transistor 49 off and the transistor 50 on.

As described above, according to this invention, the rotation of the turntable can be electrically damped and the reverse rotation of the turntable can also be prevented.

What we claim is:

1. An apparatus for damping the rotation of a turntable, comprising:
    a motor having its drive shaft coupled with the turntable for driving the turntable, said motor having a rotor magnet composed of plural magnetic poles and fixed to said drive shaft, Hall-effect elements sequentially coupled magnetically to said poles of said rotor magnet for generating output signals having polarities corresponding to the polarities of said poles of said rotor magnet, stator coils to which the output signals of said Hall-effect elements are supplied for generating drive magnetic flux, and a first speed detector disposed in the magnetic field of said rotor magnet for generating a speed signal in accordance with the rotational speed of said rotor magnet;
    a speed control circuit which has a reference signal source, to which the speed signal from said first speed detector is supplied, and which compares said speed signal with said reference signal so as to obtain a speed control signal;
    an amplifier which receives and amplifies said speed control signal from said speed control circuit and supplies the amplified speed control signal to said Hall-effect elements;
    a first signal converter which receives said speed signal from said first speed detector to convert said speed signal to a pulse signal;
    a second speed detector disposed in the magnetic field of said rotor magnet for delivering a speed signal according to the rotational speed of said rotor magnet and having a phase different from that of said speed signal from said first speed detector;
    a second signal converter which receives said speed signal from said second speed detector to convert said speed signal to a pulse signal;
    a gate circuit which receives the output pulse signals from said first and second signal converters and which is cut off by said output pulse signal from said first signal converter and turned conductive by said output pulse signal from said second signal converter;
    a switching circuit which receives the output signal of said gate circuit and is turned conductive by said output signal to deliver a control signal having a polarity opposite to that of said speed control signal from said amplifier; and
    means for supplying said control signal from said switching circuit to said Hall-effect elements when the rotation of said motor is to be stopped.

2. An apparatus for damping the rotation of a turntable, comprising:
    a motor having its drive shaft coupled with the turntable for driving the turntable, said motor having a rotor magnet composed of plural magnetic poles and fixed to said drive shaft, Hall-effect elements sequentially coupled magnetically to said poles of said rotor magnet for generating output signals having polarities corresponding to the polarities of said poles of said rotor magnet, stator coils to which the output signals of said Hall-effect elements are supplied for generating drive magnetic flux, and a first speed detector disposed in the magnetic field of said rotor magnet for generating a speed signal in accordance with the rotational speed of said rotor magnet;

a speed control circuit which has a reference signal source, to which the speed signal from said first speed detector is supplied, and which compares said speed signal with said reference signal so as to obtain a speed control signal;

an amplifier which receives and amplifies said speed control signal from said speed control circuit and supplies the amplified speed control signal to said Hall-effect elements;

a first switching circuit which receives said speed signal from said first speed detector to convert said speed signal to a pulse signal;

a second speed detector disposed in the magnetic field of said rotor magnet for delivering a speed signal according to the rotational speed of said rotor magnet and having a phase different from that of said speed signal from said first speed detector;

a second switching circuit which receives said speed signal from said second speed detector to convert said speed signal to a pulse signal;

a gate circuit which receives the output pulse signals from said first and second switching circuits and which is cut off by said output pulse signal from said first switching circuit and turned conductive by said output pulse signal from said second switching circuit, thereby producing a pulse signal;

a third switching circuit which receives the pulse signal of said gate circuit and is turned conductive by this pulse signal to deliver a control signal having a polarity opposite to that of said speed control signal from said amplifier; and means for supplying said control signal from said third switching circuit to said Hall-effect elements when the rotation of said motor is to be stopped.

3. An apparatus for damping the rotation of a turntable, as claimed in claim 2, wherein each of said first and second switching circuits comprises a Schmitt trigger circuit.

4. An apparatus for damping the rotation of a turntable, comprising:

a motor having its drive shaft coupled with the turntable, for driving the turntable, said motor having a rotor magnet composed of plural magnetic poles and fixed to said drive shaft, Hall-effect elements sequentially coupled magnetically to said poles of said rotor magnet for generating output signals having polarities corresponding to the polarities of said poles of said rotor magnet, stator coils to which the output signals of said Hall-effect elements are supplied for generating drive magnetic flux, and a first speed detecting coil disposed in the magnetic field of said rotor magnet for generating a speed signal in accordance with the rotational speed of said rotor magnet;

a frequency-voltage converter which receives said speed signal from said first speed detecting coil to convert said speed signal to a D.C. voltage according to the frequency of said speed signal;

a voltage comparator which has a source of reference D.C. voltage and which receives said D.C. output voltage from said frequency-voltage converter and compares said D.C. output voltage of said frequency-voltage converter with said reference D.C. voltage to deliver a speed control voltage having a desired polarity;

means for supplying said speed control voltage to said Hall-effect elements;

a first switching circuit which receives said speed signal from said first speed detecting coil to deliver a pulse signal having a repetition frequency in accordance with the frequency of said speed signal;

a second speed detecting coil disposed in the magnetic field of said rotor magnet for generating a speed signal having a frequency in accordance with the rotational speed of said rotor magnet and having a phase different from that of said speed signal from said first speed detecting coil;

a second switching circuit which receives said speed signal from said second speed detecting coil to deliver a pulse signal having a repetition frequency corresponding to the frequency of said speed signal;

a gate circuit which receives said output pulse signals of said first and second switching circuits and which is cut off by said output pulse signal of said first switching circuit and turned conductive by said output pulse signal of said second switching circuit to deliver a pulse signal;

a third switching circuit which receives said output pulse signal of said gate circuit and is turned conductive by said output pulse of said gate circuit to generate a control voltage having a polarity opposite to that of said speed control voltage from said voltage comparator; and means for supplying said control voltage of said third switching circuit to said Hall-effect elements when the rotational speed of said turntable is to be lowered.

* * * * *